United States Patent
Hu et al.

(10) Patent No.: US 9,730,289 B1
(45) Date of Patent: Aug. 8, 2017

(54) SOLID STATE LIGHT FIXTURES HAVING ULTRA-LOW DIMMING CAPABILITIES AND RELATED DRIVER CIRCUITS AND METHODS

(71) Applicant: Cree, Inc., Durham, NC (US)

(72) Inventors: Yuequan Hu, Cary, NC (US); Qingcong Hu, Morrisville, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/018,375

(22) Filed: Feb. 8, 2016

(51) Int. Cl.
*G05F 1/00* (2006.01)
*H05B 33/08* (2006.01)

(52) U.S. Cl.
CPC ..... *H05B 33/0845* (2013.01); *H05B 33/0812* (2013.01); *H05B 33/0815* (2013.01)

(58) Field of Classification Search
CPC .... H05B 37/02; H05B 41/34; H05B 33/0803; H05B 39/09; H05B 41/28; H05B 33/0809; H05B 41/2928; H05B 41/2806; H05B 33/0815; H05B 33/0818; H05B 41/2828; H05B 41/3921; H05B 41/3927; Y02B 20/208; H01J 65/046; H01J 61/827
USPC ............. 315/291, 307–308, 224, 246, 209 R
See application file for complete search history.

(56) References Cited

U.S. PATENT DOCUMENTS

| | | | |
|---|---|---|---|
| 8,044,609 B2 * | 10/2011 | Liu ...................... | H05B 33/086 315/291 |
| 2003/0214242 A1 | 11/2003 | Berg-johansen | |
| 2010/0327835 A1 * | 12/2010 | Archibald .......... | H05B 33/0818 323/282 |
| 2011/0080110 A1 | 4/2011 | Nuhfer et al. | |
| 2013/0088151 A1 * | 4/2013 | Dunn ................. | H05B 33/0812 315/113 |
| 2013/0278145 A1 | 10/2013 | Lin et al. | |
| 2015/0084527 A1 * | 3/2015 | Siu ..................... | H05B 33/0815 315/186 |

OTHER PUBLICATIONS

Notification of Transmittal of the International Search Report and the Written Opinion of the International Searching Authority, or the Declaration, PCT Application No. PCT/US2017/016884, Apr. 18, 2017 (11 pp.).

* cited by examiner

Primary Examiner — Minh D A
(74) Attorney, Agent, or Firm — Myers Bigel, P.A.

(57) ABSTRACT

A solid state light fixture includes a light emitting diode (LED) load and a driver circuit that selectively provides one of a switched-mode drive current and a linear-mode drive current to the LED load in response to a dimming control signal.

20 Claims, 10 Drawing Sheets

US 9,730,289 B1

SOLID STATE LIGHT FIXTURES HAVING ULTRA-LOW DIMMING CAPABILITIES AND RELATED DRIVER CIRCUITS AND METHODS

FIELD OF INVENTION

The present application generally relates to solid state lighting fixtures, and more particularly, to dimmable solid state lighting fixtures and related driver circuits and methods.

BACKGROUND

As is well known to those of skill in the art, a light-emitting diode (LED) is a solid state semiconductor device that includes one or more p-n junctions. LEDs emit light when current flows through the p-n junctions thereof. The brightness and energy efficiency of the light emitted by an LED may be directly related to the amount of operating or "drive" current flowing through the p-n junction of the LED. Typically, an LED is designed to operate at a drive current level that provides both high brightness and high energy efficiency. LED-based solid state light fixtures include driver circuits that provide the drive current to the LEDs.

Initially, LEDs were primarily used in specialty lighting applications such as providing back-lighting and/or indicator lights in electronic devices. As the light output and energy efficiency of LEDs has improved, LEDs have been used to form solid state light fixtures such as LED-based light bulbs, downlights, streetlights and the like. These LED-based solid state light fixtures are increasingly replacing conventional incandescent and fluorescent light bulbs in numerous applications including general illumination applications such as lighting for homes and offices. These solid state light fixtures generate less heat, are far more energy efficient and have far longer lifetime as compared to incandescent light bulbs. Solid state LED-based light fixtures also exhibit numerous advantages over fluorescent light bulbs, including better energy efficiency, faster turn-on, better dimmability and longer lifetime. LED-based solid state light fixtures may also generate more aesthetically pleasing light than fluorescent light bulbs, and do not contain mercury.

SUMMARY

Pursuant to embodiments of the present invention, solid state light fixtures are provided that include a light emitting diode (LED) load and a driver circuit that selectively provides one of a switched-mode drive current and a linear-mode drive current to the LED load in response to a dimming control signal.

In some embodiments, the driver circuit may include a first current regulation circuit that is configured to provide the switched-mode drive current to the LED load and a second current regulation circuit that is configured to provide the linear-mode drive current to the LED load. The second current regulation circuit may include a first switch that the linear-mode drive current continuously flows through when the second current regulation circuit is activated.

In some embodiments, the first switch may be coupled in series between the LED load and a current sensing resistor.

In some embodiments, the second current regulation circuit may include an amplifier having an output that controls an amount of current flowing through the first switch to regulate the current flowing through the LED load.

In some embodiments, the second current regulation circuit may further include a second switch that is coupled in series between the output of the amplifier and ground.

In some embodiments, the amplifier may have a first input that receives a signal that is proportional to a current flowing through the LED load and a second signal that is proportional to a reference current level for the LED load.

In some embodiments, a third switch that is included in the first current regulation circuit may be configured to provide the switched mode drive current to the LED load when the first current regulation circuit is activated and to deactivate the first current regulation circuit when the second current regulation circuit is activated.

In some embodiments, the driver circuit may further include a rectifier circuit that is configured to rectify an input alternating current voltage, a boost power factor correction converter that is coupled to an output of the rectifier, and a buck converter that is coupled to an output of the boost power factor correction converter. In such embodiment, the first current regulation circuit may be part of the buck converter.

In some embodiments, the second current regulation circuit may be coupled in series to the output of the LED load.

In some embodiments, the driver circuit may include a control circuit that is configured to disable the first current regulation circuit and enable the second current regulation circuit in response to the dimming control signal having a value specifying dimming the solid state light fixture below a preselected level.

In some embodiments, the first current regulation circuit may include a first resistor that is coupled in series with the third switch and the second current regulation circuit may include a first switch and a second resistor that are coupled in series to the LED load.

In some embodiments, the second resistor may be at least two orders of magnitude larger than the first resistor.

Pursuant to further embodiments of the present invention, solid state light fixtures are provided that include an LED load, a boost power factor correction converter that includes a first switch, a driver circuit that supplies a drive current to the LED load, the driver circuit including a first current regulation circuit that includes a second switch and a second current regulation circuit that includes a third switch that is electrically connected to the LED load, and a control circuit that is configured to selectively enable one of the first and second current regulation circuits to regulate the drive current.

In some embodiments, the control circuit may be configured to selectively enable the second current regulation circuit and disable the first current regulation circuit in response to the dimming control signal having a value specifying dimming the solid state light fixture below a preselected level.

In some embodiments, the second current regulation circuit may comprise a linear current regulator. The linear current regulator may include a first switch that is coupled in series between the LED load and a reference voltage. The linear current regulator may also include an amplifier having an output that controls an amount of current flowing through the first switch to regulate the current flowing through the LED load. The amplifier may, for example, have a first input that receives a signal that is proportional to a current flowing through the LED load and a second signal that is proportional to a reference current level for the LED load. The linear current regulator may further include a second switch that is coupled in series between the output of the amplifier and the reference voltage.

In some embodiments, the first current regulation circuit may be a switched-mode current regulation circuit.

In some embodiments, a switch included in the first current regulation circuit may be configured to provide a switched-mode drive current to the LED load when the first current regulation circuit is activated and to deactivate the first current regulation circuit when the second current regulation circuit is activated.

In some embodiments, the driver circuit may further include a boost power factor correction converter that includes a first switch, a driver circuit that supplies a drive current to the LED load, the driver circuit including a first current regulation circuit that includes a second switch and a second current regulation circuit that includes a third switch that is electrically connected to the LED load and a control circuit that is configured to selectively enable one of the first and second current regulation circuits to regulate the drive current.

In some embodiments, the control circuit may be configured to selectively enable one of the first and second current regulation circuits in response to a dimming control signal.

Pursuant to yet additional embodiments of the present invention, methods of dimming a solid state light fixture having an LED load are provided. Pursuant to these methods, a drive current having a first average current level is supplied to the LED load via a first switched-mode current regulation circuit. A drive current having a second average current level that is less than the first average current level is then supplied to the LED load using a linear current regulator.

In some embodiments, the second average current level may be at least 90% less than the first average current level. In some embodiments, the second average current level may be at least 99% less than the first average current level.

In some embodiments, the control circuit may supply the drive current having the second average current level to the LED load using the liner current regulator in response to a dimming control signal that has a value specifying dimming the solid state light fixture below a pre-selected level.

In some embodiments, the linear current regulator may include a first switch that is coupled in series between the LED load and a reference voltage. In some embodiments, the linear current regulator may include an amplifier having an output that controls an amount of current flowing through the first switch to regulate the current flowing through the LED load. In some embodiments, the linear current regulator may further include a second switch that is coupled in series between the output of the amplifier and the reference voltage.

Pursuant to still further embodiments of the present invention, driver circuits are provided that include a first current regulation circuit that is configured to provide a switched-mode drive current to a load, a second current regulation circuit that is configured to provide a linear-mode drive current to the load, the second current regulation circuit including a first switch that the linear-mode drive circuit continuously flows through when the second current regulation circuit is activated, and a control circuit that selectively provides one of the switched-mode drive current and the linear-mode drive current to the load in response to a control signal.

In some embodiments, the control signal may be a dimming control signal.

In some embodiments, the solid state light fixture may include an image sensor configured to detect an image of an object illuminated by the LED load.

A solid state light fixture according to further embodiments includes a light emitting diode (LED) load, a boost power factor correction converter that includes a first switch and that supplies a drive current to the LED load, a linear regulator that is coupled to the LED load and is configured to regulate a level of the drive current, and a control circuit that is configured to cause the linear regulator to regulate the drive current in response to a dimming control signal.

BRIEF DESCRIPTION OF THE FIGURES

The above and other aspects and features of the present invention will become more apparent by the following description of example embodiments thereof with reference to the attached drawings. In the drawings and specification, like numbers refer to like elements.

DETAILED DESCRIPTION

Figure 1:
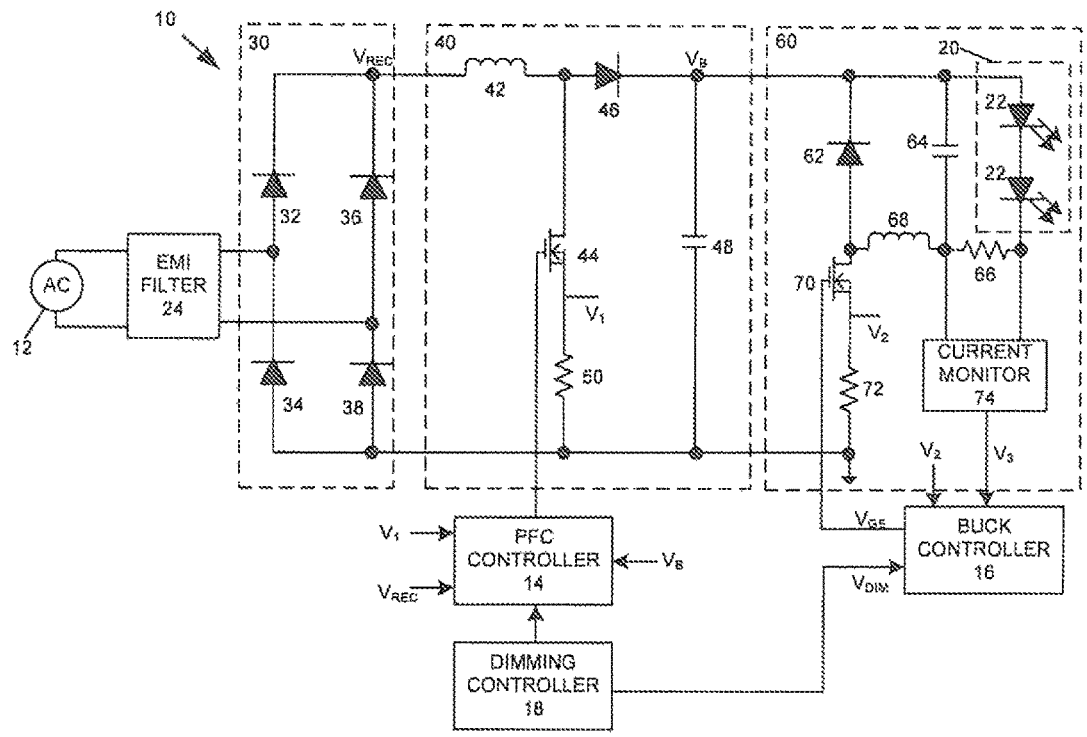
FIG. 1 is a circuit diagram of a conventional driver circuit that has dimming capabilities.

Pursuant to embodiments of the present invention, solid state light fixtures are provided that have ultra-low dimming capabilities, along with related driver circuits that may be used in, or in conjunction with, these solid state light fixtures. The driver circuits according to various embodiments operate in one of a switching mode to accommodate normal operation or moderate dimming and a linear mode to accommodate ultra-low dimming. In particular, a linear current regulator is provided for ultra-low dimming operation. During normal or moderate dimming operation, the linear current regulator may be decoupled from the LED load or otherwise operated in a manner to reduce power loss in the linear current regulator. In some embodiments, the linear current regulator may be selectively activated to provide ultra-low level dimming.

The driver circuits included in the solid state light fixtures according to some embodiments of the present invention have current regulation circuitry that operates in (at least) two different operating modes. In particular, the current regulation stage of the driver circuits according to embodiments of the present invention may operate in either a switching mode to accommodate normal operation and moderate dimming or in a linear mode to accommodate ultra-low dimming. In the switching mode, a control circuit of the driver circuit may control a first switch that turns on and off at a high frequency (e.g., 20 kHz to a few hundred kHz) to regulate the current supplied to the LED load (which may comprise one or more LEDs). The drive current provided by a current regulation stage that operates in the switching mode is referred to herein as a switched-mode drive current. In the linear mode, the control circuit may control a second switch that is part of a linear current regulator to regulate the drive current that is supplied to the LED load. The drive current provided by a linear current regulator is referred to herein as a linear-mode drive current The linear mode may be used when the solid state light fixture is dimmed to low or ultra-low levels. As will be explained in greater detail below, by configuring the driver circuit for the solid state light fixture to selectively operate in one of two different drive modes, high energy efficiency can be realized during full power operations and during moderate dimming when the current regulation stage is operated in a first mode. When the current regulation stage is operated in a second mode, the light fixtures may be dimmed to ultra-low levels while still providing a smooth and stable light output. Ultra-low dimming may be used, for example, when the solid state light fixtures according to embodiments of the present invention operate in conjunction with an image sensor, camera or other sensor device.

Conventional high power driver circuits for solid state light fixtures have current regulation stages that are configured to operate in a switching mode in order to reduce power loss and improve efficiency. Unfortunately, because of the switching nature of these circuits, the drive current to the LED load and hence the light output by the LED load, may become unstable during low-level dimming, which may be aesthetically unpleasing and/or causes discomfort to human observers.

FIG. 1 is a circuit diagram of a conventional driver circuit 10 for a solid state light fixture. As shown in FIG. 1, the driver circuit 10 includes an alternating current (AC) voltage source 12, a boost power factor correction (PFC) controller 14, a buck controller 16 and a dimming controller 18. The driver circuit 10 further includes an EMI filter 24, a bridge rectifier 30, a boost PFC converter 40, and a buck converter 60. The driver circuit 10 supplies a drive current to an LED load 20, which is exemplarily illustrated in FIG. 1 as comprising a pair of LEDs 22 that are disposed-in series. While the LED load 20 is illustrated in FIG. 1 to facilitate explanation of the operation of the driver circuit 10, it will be appreciated that the LEDs 22 that form the LED load 20 are not part of the driver circuit 10 but instead comprise the load that is driven by the driver circuit 10.

The AC voltage source 12 may comprise, for example, a standard 120 V wall outlet. It will be appreciated, however, that a wide variety of AC voltage sources 12 may be used such as, for example, AC voltage sources that output AC voltages in the range of 100 V to 277 V or higher. The driver circuit 10 converts the AC voltage input from the AC voltage source 12 into a direct current (DC) voltage that is suitable for powering the LED load 20.

The EMI filter 24 is used to filter out high frequency noise that may be present on the AC power output from the AC voltage source 12 and noise generated by the driver circuit 10. The EMI filter 24 may, for example, divert high frequency noise components that are carried on the conductors of the AC voltage source 12 to ground. EMI filters are well known in the art and hence further description thereof will be omitted here.

The bridge rectifier circuit 30 comprises a series of diodes 32, 34, 36, 38 that are arranged in a bridge configuration as shown in FIG. 1. The bridge rectifier circuit 30 rectifies the AC output from the AC voltage source 12 to provide a DC voltage at the output of the bridge rectifier 30. Bridge rectifier circuits are also well known in the art and hence further description thereof will be omitted here.

The DC voltage output by the bridge rectifier circuit 30 ($V_{REC}$) is the input to the boost PFC converter 40. The boost PFC converter 40 includes an inductor 42, a switch 44, a diode 46, a capacitor 48 and a resistor 50. The boost PFC converter 40 functions as a DC-to-DC power converter that converts a DC voltage that is input from the bridge rectifier circuit 30 into a higher voltage DC voltage $V_B$ that is output from the boost PFC converter 40. As the boost PFC converter 40 steps up the voltage, the current output by the boost PFC converter 40 is necessarily reduced as compared to the input current as power (P=V*I) must be conserved.

The switch 44 may comprise, for example, a MOSFET transistor 44. The boost PFC controller 14 provides a control signal to the gate of the MOSFET 44 in order to turn the transistor on and off. When the MOSFET 44 is turned on (i.e., the switch 44 is closed), current flows through the inductor 42 in the clockwise direction and the inductor 42 stores energy by generating a magnetic field. When the MOSFET 44 is turned off (i.e., the switch 44 is opened), the only path for the current is through the flyback diode 46, and hence the capacitor 48 is charged when the MOSFET 44 is turned off. There are two modes of PFC operations, namely a continuous conduction mode (CCM) and a discontinuous conduction mode (DCM). In the CCM mode of operation, the switch 44 is cycled between its on and off states fast enough so that the inductor 42 does not fully discharge during each time period when the switch 44 is turned off (opened). In the DCM mode of operation, the inductor 42 current always decreases to zero (i.e., the inductor 42 is fully discharged) during each time period when the switch 44 is turned off (opened). When the switch 44 is turned off, the DC voltage output by the bridge rectifier circuit 30 and the inductor 42 appear as two voltage sources in series which allows the capacitor 48 to be charged to a voltage higher than the DC voltage $V_{REC}$ that is output by the bridge rectifier circuit 30. When the switch 44 is closed by turning the MOSFET 44 on, the DC voltage output by the bridge rectifier circuit 30 is applied across the inductor 42 and diode 46 is reverse biased. As such, current does not flow from the bridge rectifier circuit 30 to the output of the boost PFC converter 40, and the capacitor 48 provides the voltage and current to the output of the boost PFC converter 40. The capacitor 48 is recharged the next time the switch 44 is opened in the manner described above. Thus, by controlling the frequency and/or duty cycle at which the switch 44 is turned on and off, the boost PFC controller 14 may regulate the output voltage of the boost PFC converter 40 (i.e., the voltage across capacitor 48). The boost PFC converter 40 also provides power factor correction by shaping the input current so that it follows the shape of the input AC voltage provided by the AC voltage source 12. The boost PFC converter 40 may achieve a high level of power factor correction (greater than 0.9) and low total harmonic distortion (less than 20%).

The boost PFC controller 14 may receive as inputs voltages $V_I$, $V_{REC}$ and $V_B$. Voltage $V_I$ is the voltage drop across resistor 50, which may be used to sense the current flowing through the switch 44. Voltage $V_{REC}$ is the voltage at the output of the bridge rectifier circuit 30. Voltage $V_B$ is the voltage across the output of the boost PFC converter 40. The PFC controller 14 may use these voltages to adjust the frequency and/or duty cycle at which the switch 44 is turned on and off to maintain the output voltage $V_B$ at a desired level while also achieving a high degree of power factor correction. A controller that is commercially available from ST Microelectronics (part number L6564) can be used to implement the boost PFC controller 14.

The buck converter 60 regulates the drive current supplied to the LED load 20. The DC voltage output by the boost PFC converter 40 is applied across the input to the buck converter 60. The buck converter 60 includes a diode 62, a capacitor 64, a first resistor 66, an inductor 68, a switch 70, a second resistor 72 and a current monitor 74. The switch 70 is used to regulate the amount of drive current that is supplied to the LED load 20, as will be explained in more detail below. The switch 70 may comprise, for example, a MOSFET transistor 70. The buck controller 16 provides a control signal $V_{GS}$ to the gate of the MOSFET 70 in order to turn the MOSFET 70 on and off. The first resistor 66 and the inductor 68 are coupled in series with output of the LED load 20, and the capacitor 64 is connected in parallel across the LED load 20.

The switch 70 is turned on and off to regulate the drive current flowing through the LED load 20. In particular, the current monitor 74 senses the current flowing through the LED load 20. The capacitor 64 maintains the voltage across the LED load relatively constant, thereby providing a relatively constant current to the LED load 20, and filters out AC components in the drive current. The diode 62 provides a current path that allows the energy stored in the inductor 68 to be released to the LED load 20.

The current monitor 74 is connected across the first resistor 66 and outputs a signal that reflects the current flowing through the LED load 20. In the depicted embodiment, the current monitor 74 outputs a voltage signal $V_3$ that reflects the voltage drop across the first resistor 66. Since the value of first resistor 66 is known, the load current can be calculated directly from the voltage drop $V_3$ via Ohms Law. The second resistor 72 is coupled between the switch 70 and a reference voltage (e.g., ground). The voltage $V_2$ at the connection between the switch 70 and the second resistor 72 reflects the voltage drop across the second resistor 72, and thus may be used to measure the current flowing through the switch 70.

The buck converter 60 may operate as follows. The DC signal output by the boost PFC converter 40 provides a current to the LED load 20. The buck controller 16 regulates the current flowing through the LED load 20 by sensing the current through the LED load 20 (represented by voltage $V_3$) and the current flowing through the switch 70 (represented by voltage $V_2$). The buck controller 16 outputs a signal $V_{GS}$ to the gate of the MOSFET 70 to regulate the current through the LED load 20. When the signal $V_{GS}$ that is applied to the gate of the MOSFET 70 is high, the MOSFET 70 is turned on (i.e., the switch 70 is closed) and current flows from the boost PFC converter 40 through the LED load 20, through the first resistor 66 and the inductor 68 and then through the switch 70. The inductor 68 stores energy by generating a magnetic field during such time periods. When the signal $V_{GS}$ that is applied to the gate of the MOSFET 70 is brought low, the MOSFET 70 is turned off (i.e., the switch 70 is opened) and the inductor 68 discharges through the diode 62 to maintain the current flow through the LED load 20. In a fixed switching frequency CCM mode of operation, a comparator in the buck controller 16 compares the signal $V_2$ to an error signal. The error signal may be the result of a comparison of signal $V_3$ to a reference voltage that reflects a desired drive current level for the LED load 20. When signal $V_2$ reaches the error signal level, the control signal $V_{GS}$ is pulled low and the switch 70 is turned off (opened). When next switching cycle starts, the control signal $V_{GS}$ is set to high and the switch 70 is turned back on again. A controller that is commercially available from Texas Instruments (part number UC3843) can be used to implement the buck controller 16 when operated in the CCM mode of operation. If the buck controller 16 is operated in a CCM/DCM critical mode of operation, i.e., the switch 70 is turned on at the moment the current of the inductor 68 decreases to zero. When signal $V_2$ reaches the error signal level (a comparison of signal $V_3$ to a reference voltage that reflects a desired drive current level for the LED load 20), the control signal $V_{GS}$ is pulled low and the switch 70 is turned off (opened). A controller that is commercially available from Texas Instruments (part number UCC28811D) or a controller commercially available from ST Microelectronics (part number L6564) can be used to implement the buck controller 16. In CCM/DCM critical mode operation, the switching frequency of the switch 70 varies, i.e., it increases as the current through the LED load 20 decreases and vice versa.

The ability to dim a solid state light fixture may be very important in various applications, including general illumination and specialty lighting applications within the home. Low and/or ultra-low dimming may also be desired or necessary in some applications, either for consumer preference or so that the solid state light fixture can operate in conjunction with an internal or external sensor such as an image sensor. As noted above, the driver circuit 10 includes a dimming control circuit 18 that may be used to accomplish such dimming. In particular, the dimming control circuit 18 may generate one or more control signals that control other elements of the driver circuit 10 to reduce the level of drive current flowing through the LED load 20, thereby reducing the amount of light output by the LEDs 22. The dimming control circuit 18 may operate in response to an external control signal. The dimming control circuit 18 generates a dimming control signal $V_{DIM}$ that is provided to the buck controller 16 to control the dimming operations. The dimming control circuit 18 may also provide a control signal to the boost PFC controller 14 that is used to enable or disable the boost PFC operation.

The buck controller 16 may control the brightness of light emitted by the LED load 20 in one of two ways in response to the control signals provided by the dimming control circuit 18. In a first approach for dimming, the buck controller 16 may reduce the average current supplied to the LED load 20. This may be accomplished, for example, by reducing a current reference that is used by the buck controller 16 to determine the level of current flowing through the load. The frequency at which the switch 70 is toggled between its on and off states may be increased to reduce the current flow through the LED load 20 when the buck converter 60 is operated in CCM/DCM critical mode.

During normal (i.e., non-dimmed) operation, the current supplied to the LED load 20 can be very high, such as, for example, a current of 1.5 A for power LEDs. Reducing the level of the drive current supplied to the LED load 20 by the buck converter 60 will not result in issues for moderate levels of dimming. However, when very low dimming is required, issues may arise. For example, if the same dimming, i.e., the buck converter 60 operates in a switched mode with an adjustable current reference is used in the driver circuit 10 of FIG. 1 and the light output must be dimmed to 0.1% of the normal level, then assuming a nominal drive current of 1.5 A, the drive current flowing to the LED load 20 must be regulated to be at 1.5 mA to achieve the desired level of dimming. As discussed above, the current monitor 74 is used to measure the drive current flowing through the LED load 20, and hence must be able to accurately measure this 1.5 mA drive current in order to maintain the drive current at the value necessary to achieve the desired level of dimming. Typically, the first and second resistors 66, 72 are implemented using resistors having low resistances in order to reduce the power loss. Thus, in an example implementation, each of the resistors 66, 72 might be implemented as a 0.25Ω resistor. As an example, if the buck converter 60 is operating in CCM/DCM critical mode (i.e., a mode where the switch 70 is turned on each time the current flowing from the inductor 68 drops to zero), the control signal V2 that reflects the current flowing through the switch 70 and the control signal V3 that reflects the current flowing through the LED load 20 will have values of 0.75 mV and 0.375 mV, respectively. At these low voltage levels, noise generated in the driver circuit 10 and/or external noise may be close in magnitude to the control signals V2 and V3 and hence it may be difficult or impossible for the buck controller 16 to achieve stable regulation of the drive current supplied to the LED load 20, as the noise will create significant instabilities in the drive current levels. While resistors having higher resistances could be used to implement the first and second resistors 66, 72 in order to increase the magnitude of the control signals V2 and V3 during ultra-low dimming operation, the use of higher resistance resistors increases the power loss and is not a practical solution for applications where ultra-low dimming capabilities are desired.

In the second approach, pulse width modulation dimming is used. With pulse width modulation dimming, the drive current flowing through the LED load 20 may be maintained at its normal peak value (i.e., the value during non-dimming operations). A duty cycle is applied so that the drive current is supplied to the LED load 20 as a pulsed signal. During a first portion of each cycle, the drive current is supplied to the LED load 20, and then the drive current is cut off (by opening switch 70) from the LED load 20 (except for the current supplied by the inductor 68) during the second portion of each cycle. In this fashion, the peak current supplied to the LED load 20 may be maintained constant, but the average current is reduced. The amount of dimming applied may be controlled by varying the duty cycle of the pulses (i.e., the percentages of each cycle during which the drive current is and is not supplied to the LED load 20).

As pulse width modulation dimming maintains the drive current supplied to the load at its peak level, the above-discussed problems with reducing the peak current to achieve ultra-low dimming will not be present when pulse width modulation dimming is used, as the drive current would be maintained at 1.5 A in the example above, but would only be applied to the LED load 20 for a very small fraction (1/1000th) of each cycle. Unfortunately, due to the long "off" periods in the duty cycle that are necessary to achieve ultra-low dimming, undesired flickering or shimmering may result when pulse width modulation dimming is used, which may cause discomfort for a human observer. Such flickering and/or shimmering may be reduced by using a very large electrolytic capacitor (e.g., 470 microfarads) to implement the capacitor 64. However, the use of such large electrolytic capacitors may be impractical in many applications due to cost and/or size constraints, lifetime requirements and/or because the response time of the capacitor may be inadequate. Instead of using a large capacitor 64 to address the problem of flicker during ultra-low dimming, the frequency of the pulse width modulation of the drive current may be increased in order to reduce the length of each "off" cycle. However, the use of high frequency pulse width modulation may be undesirable because, when ultra-low dimming is needed, the time for the buck converter 60 to operate will become too short for the LED current to be regulated as desired due to the response time of the buck converter 60.

As discussed above, pursuant to embodiments of the present invention, solid state light fixtures are provided that have ultra-low dimming capabilities, along with related driver circuits that may be used in these solid state light fixtures. The solid state light fixtures according to embodiments of the present invention have driver circuits with current regulation circuitry that operates in (at least) two different operation modes. In particular, the current regulation stage of the driver circuits according to embodiments of the present invention may operate in either a switching mode or in a linear mode. In the switching mode, a control circuit that is part of the current regulation stage may be used to control a first switch that turns on and off at a high frequency (e.g., 20 kHz to a few hundred kHz) to regulate the current supplied to the LED load (which may comprise one or more LEDs). The switching mode may be used to provide the drive current to the LED load during normal (non-dimmed) operation and during dimming to moderate levels. Either amplitude dimming, i.e., changing the amplitude of the LED load current with switch 70 operating at high frequency, or pulse width modulation dimming may be used when the current regulation circuitry operates in switching mode.

When the solid state light fixture is to be dimmed to low and/or ultra-low levels, the current regulation stage may switch to a linear mode to provide a linear-mode drive current to the LED load. In the linear mode, the control circuit of the current regulation stage may control a second switch such as, for example, a MOSFET or bipolar junction transistor (BJT) to regulate the current through the LED using a linear current regulator. In particular, the control circuit may adjust an amount of current that continuously flows through the second switch to regulate the drive current supplied to the LED load. Thus, the control circuits of the current regulation stages of the driver circuits according to embodiments of the present invention may selectively supply either a switched-mode drive current or a linear-mode drive current to the LED load. The type of drive current supplied to the LED load may be based, for example, on an amount that the light output by the solid state light fixture is to be dimmed. As will be explained in greater detail below, by configuring the solid state light fixture to selectively operate in one of two different drive modes, high energy efficiency can be realized during full power operations and during moderate dimming and, at the same time, the light fixtures may be dimmed to low or ultra-low levels while still providing a smooth and stable light output.

Figure 2:
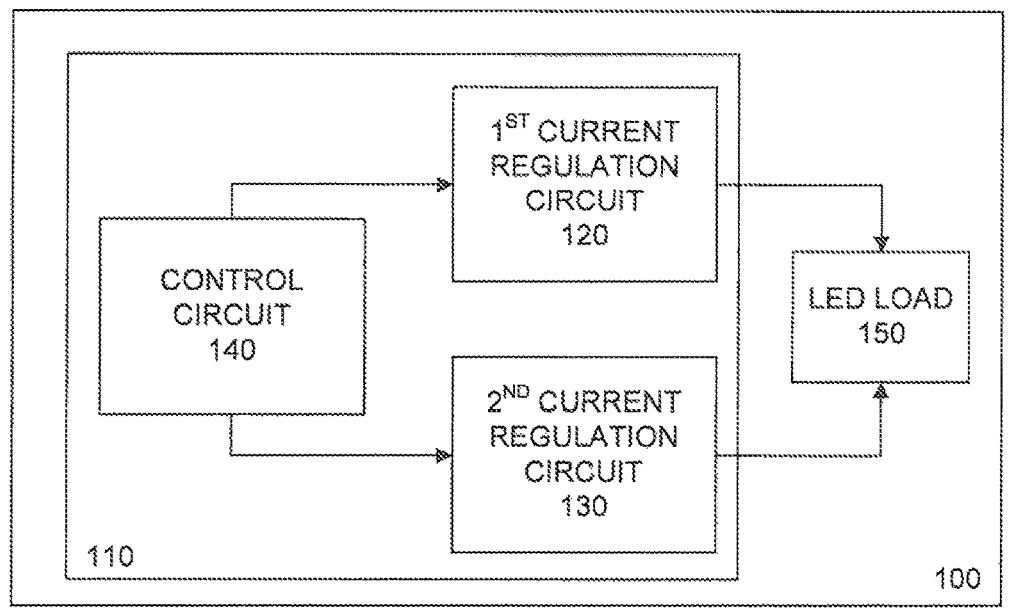
FIG. 2 and FIG. 2A are is schematic block diagram of a solid state light fixture according to embodiments of the present invention.

FIG. 2 is a schematic block diagram of a solid state light fixture 100 according to embodiments of the present invention. As shown in FIG. 2, solid state light fixture 100 includes a driver circuit 110 and an LED load 150. The LED load 150 may comprise, for example, one or more LEDs (not shown). When multiple LEDs are provided, the LEDs may be arranged in series or in parallel or a combination thereof.

Figure 2A:
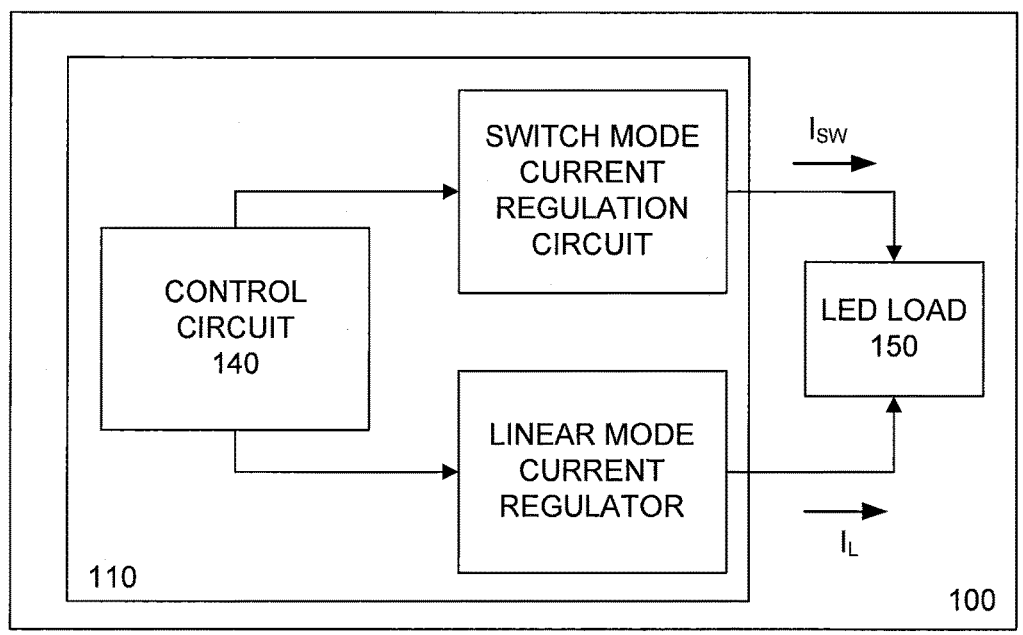

The driver circuit includes a first current regulation circuit 120, a second current regulation circuit 130 and a control circuit 140. The first current regulation circuit 120 may, for example, comprise a current regulation circuit that operates in a switching mode to provide a switched-mode drive current $I_{SW}$ to the LED load 150. For example, the buck converter 60 of the drive circuit of 10 of FIG. 1 may be used to implement the first current regulation circuit 120 in some embodiments. The second current regulation circuit 130 may, in some embodiments, be arranged in series with the LED load 150 to regulate the drive current flowing through the LED load 150. The second current regulation circuit 130 may comprise a linear current regulator in some embodiments that is used to supply a linear-mode drive current $I_L$ to the LED load 150. FIG. 2A is a schematic block diagram of such an example embodiment of the solid state light fixture of FIG. 2.

The control circuit 140 may be used to selectively activate one or the other of the first current regulation circuit 120 and the second current regulation circuit 130. While not shown in FIG. 2, one or more switches may be provided that are used to activate the first and second current regulation circuits 120, 130. The control circuit 140 may operate in response to an external dimming control signal that indicates an amount that the solid state light fixture 100 is to be dimmed.

Figure 3:
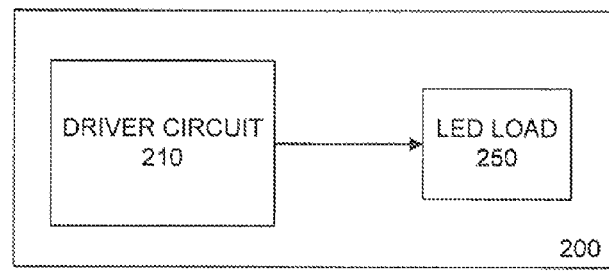
FIG. 3 is a schematic block diagram of a solid state light fixture according to further embodiments of the present invention.

FIG. 3 is a schematic block diagram of a solid state light fixture 200 according to further embodiments of the present invention. As shown in FIG. 3, solid state light fixture 200 includes a driver circuit 210 and an LED load 250. The LED load 250 may be the same as the LED load 150 that is discussed above and hence further description thereof will be omitted here.

The driver circuit 210 may be configured to selectively provide one of a switched-mode drive current and a linear-mode drive current to the LED load 250 in response to a dimming control signal. In some embodiments, the switched-mode drive current may be provided to the LED load 250 when the solid state light fixture is to operate at full power or under a moderate level of dimming, while the linear-mode drive current is provided to the LED load 250 when the solid state light fixture is to be dimmed to ultra-low levels.

Figure 4:
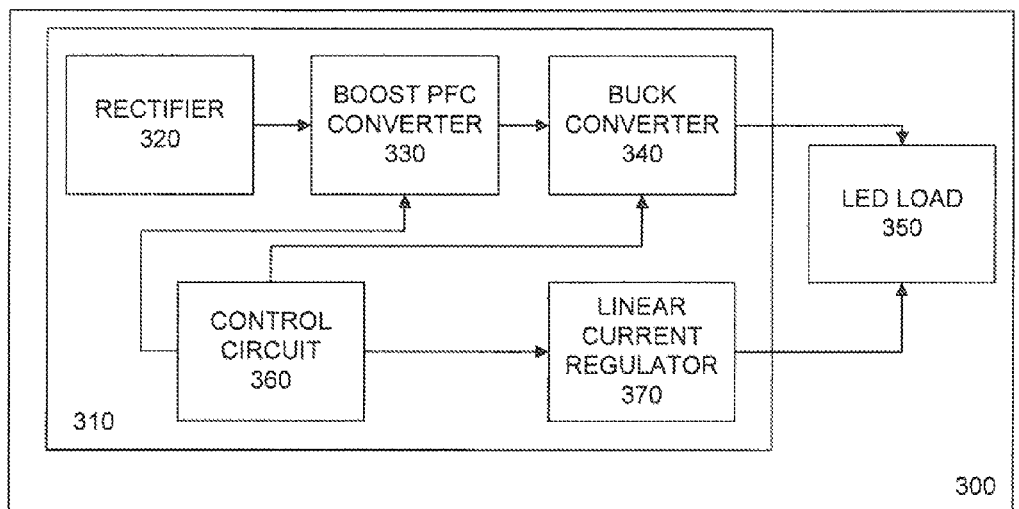
FIG. 4 is a schematic block diagram of a solid state light fixture according to additional embodiments of the present invention.

FIG. 4 is a schematic block diagram of a solid state light fixture 300 according to still further embodiments of the present invention that includes a driver circuit 310 and an LED load 350. The LED load 350 may be the same as the LED load 150 that is discussed above and hence further description thereof will be omitted here The driver circuit 310 includes a rectifier 320, a boost PFC converter 330, a buck converter 340, a control circuit 360 and a linear current regulator 370. The rectifier 320 may receive an AC voltage from an external source and may rectify this AC voltage. Any suitable rectifier circuit may be used to implement rectifier 320. The boost PFC converter 330 may receive the rectified voltage output by the rectifier 320 and may increase the voltage thereof. The boost PFC converter 330 may operate under the control of the control circuit 360. The boost PFC converter 330 may also provide power factor correction in some embodiments. The buck converter 340 may also operate under the control of the control circuit 360 to regulate the current supplied to the LED load 350 under normal operating conditions and during dimming down to a certain pre-selected level. The current regulation stage of the buck converter 340 may operate in a switched mode to reduce power losses and/or increase efficiency. When the buck converter 340 acts to regulate the current supplied to the LED load 350, the linear current regulator 370 may be turned off. When dimming to levels below the pre-selected level is required, the control circuit 360 may activate the linear current regulator 370 and may disable the buck converter 340. Under these conditions, the linear current regulator 370 may maintain the drive current through the LED load 350 at a desired level.

Figure 5:
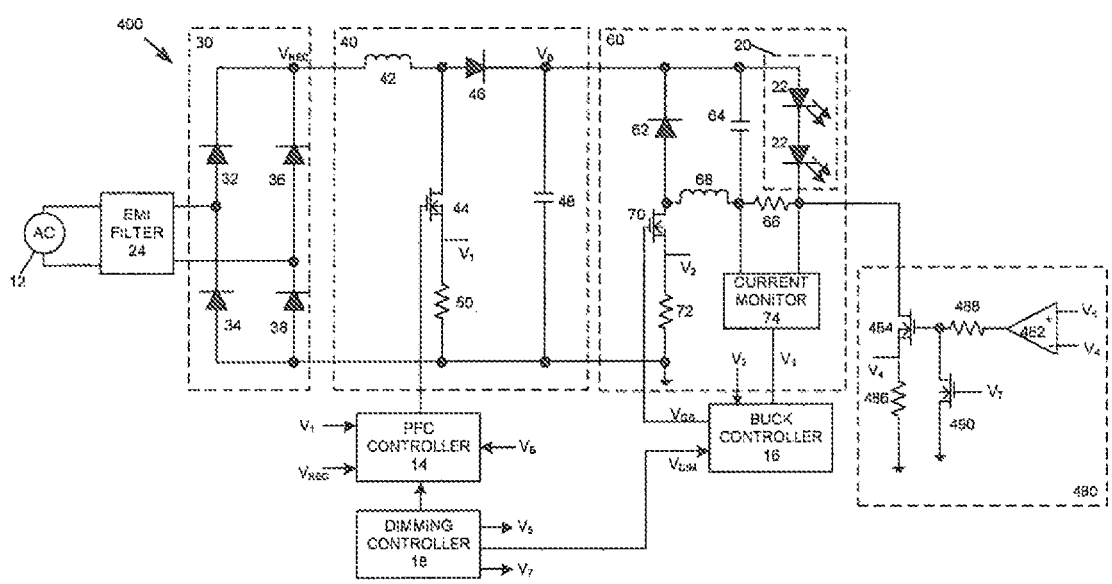
FIG. 5 is a circuit diagram of a driver circuit according to embodiments of the present invention.

FIG. 5 is a circuit diagram of a circuit driver 400 according to certain embodiments of the present invention. The circuit driver 400 includes various circuit elements that are included in the conventional LED driver circuit 10 that is discussed above with reference to FIG. 1, and hence these circuit elements are identified by the same reference numerals and further description thereof will be omitted. Additionally, the driver circuit 400 further includes a linear regulator circuit 480 (also referred to herein as a linear current regulator) that is provided in series with the LED load 20. While the LED load 20 is illustrated in FIG. 5 to facilitate explanation of the operation of the driver circuit 400, it will be appreciated that the LEDs 22 are not part of the driver circuit 400 but instead comprise the load that is driven by the driver circuit 400. The linear regulator circuit 480 may be switched on when ultra-low dimming is required.

As shown in FIG. 5, the linear regulator circuit 480 includes an error amplifier 482, a switch 484, a current sensing resistor 486, a resistor 488 and a switch 490. The switches 484 and 490 may be implemented, for example as MOSFET transistor switches. The error amplifier 482 outputs a signal through the resistor 488. During normal (non-dimmed) operation and during dimming operations where the amount the light output is to be dimmed is below a pre-selected level, the switch 490 is turned on by applying a high voltage signal V7 to the gate thereof. As the switch 490 is turned on, the gate of switch 484 is pulled to a low value, thereby turning off switch 484. Under these conditions, the linear current regulator 480 is isolated from the LED load 20, and the current regulation stage of the buck converter 60 (i.e., switch 70, inductor 68, output capacitor 64, and diode 62) operates normally in the manner described above with reference to FIG. 1 to regulate the drive current provided to the LED load 20 using switched mode current regulation.

When ultra-low dimming is required (or dimming to a level that is below the pre-selected level), the control signal $V_{GS}$ is set to a low level by the buck controller 16, thereby turning off switch 70. As a return current path no longer exists through the buck converter 460, the current regulation circuit of the buck converter 60 is fully disabled once the inductor 68 discharges. At the same time, the control signal $V_7$ may be set to a low level in order to turn off the switch 490, activating the linear regulator circuit 480.

When the linear regulator circuit 480 is activated, the error amplifier 482 operates to maintain the drive current through the LED load 20 at a desired level. The linear regulator 480 accomplishes this by inputting a signal $V_4$ that reflects the actual current through the LED load 20 and a reference signal $V_5$ to the error amplifier 482. The signal $V_4$ reflects the voltage drop across the resistor 486 (a known value), and hence directly corresponds to the drive current through the LED load 20. The reference voltage $V_5$ is a drive current reference voltage that corresponds to a desired LED load current that will achieve the specified amount of dimming requested. The voltage $V_5$ can be generated by any of the control circuits shown in FIG. 5 or by another control circuit such as, for example, a wireless-controlled module or a micro-controller within a communication bus.

When the linear current regulator 480 is activated, the gate voltage of transistor 484 is adjusted based on the voltage output by the error amplifier 482. In operation, if the drive current through the LED load 20 becomes higher than a desired value (i.e., the value corresponding to reference voltage $V_5$), $V_4$ increases. Since voltage $V_4$ is fed to the error amplifier 482, the increase in the drive current through the LED load 20 acts to decrease the output voltage of the error amplifier 482, which in turn decreases the drive current through the LED load 20 until the target drive current is achieved. If the drive current through the LED load 20 drops below the desired value, $V_4$ decreases, which causes the error amplifier 482 to increase its output voltage, resulting in an increase in the drive current through the LED load 20. Thus, the linear regulator circuit 480 may be used to set and maintain the drive current through the LED load 20 at a desired level. The linear current regulator 480 achieves this by allowing a current to flow continuously through switch 484 and adjusting the amount of current that flows by changing the voltage applied to the gate of switch 484.

Since the linear regulator circuit 480 may only be used for low or ultra-low dimming operations, the drive current through the LED load 20 will be very low when the linear regulator circuit 480 is operating. Consequently, a significantly larger current sensing resistance can be used to implement the resistor 486 (as compared to, for example, resistors 66 and 72) with only a negligible impact on power loss. For example, in one example embodiment, resistor 486 is implemented as a 124Ω resistor. Assuming an LED load drive current of 1.5 mA, the sensed signal is 0.186V across 486, and the power loss across resistor 486 is only 0.279 mW. Additional power loss will occur across the switch 484. Assuming that $V_B$=440V and $V_{LED}$=300V, the power loss across the switch 484 is 0.21 W, which is manageable. Since a tightly-regulated and continuous current flows through the LED load 20 during ultra-low dimming, no flickering or shimmering may be present.

Thus, the driver circuit 400 supplies a switched-mode drive current to the LED load 20 when the solid state light fixture is not dimmed or when the solid state light fixture receives a dimming control signal having a value specifying dimming the solid state light fixture above a pre-selected level. In contrast, the driver circuit 400 supplies a linear-mode drive current to the LED load 20 when the solid state light fixture receives a dimming control signal having a value specifying dimming the solid state light fixture below the pre-selected level. Herein, a switched-mode drive current refers to a drive current that is supplied to the LED load using a circuit having a switch that is turned on and off as part of the normal delivery of the drive current to the LED load such as, for example, the current regulation stage of the buck converters discussed above. A linear-mode drive current refers to a drive current that is supplied to the LED load in a continuous fashion without toggling a switch on and off as part of the normal delivery of the drive current to the LED load such as, for example, the drive currents supplied to the LED loads using the linear current regulator 480. A "drive current" refers to the operating current that is supplied to the LED load to power the LEDs included therein.

It should also be noted that references herein to dimming a solid state light fixture below a pre-selected level means reducing the output of the solid state light fixture so that the output is below the pre-selected level. The pre-selected level may be specified in various ways such as, for example, a fraction of the average drive current during normal (non-dimmed) operations or a fraction of the light output during normal (non-dimmed) operations.

The pre-selected level of dimming where the driver circuit 400 switches from switched mode to linear mode may be set based on a number of factors, including power loss, switching frequency, and actual operating conditions like the output voltage of the PFC boost converter 40 and the voltage of the LED load 20. If the difference between the output voltage of the PFC converter 40 and the voltage of the LED load 20 is relatively large, amplitude dimming may be used at lower load current levels to avoid the power loss of the switch 484 in the linear current regulator 480. In some embodiments, the pre-selected amount of dimming may be selected to encompass dimming in which the drive current through the LED load is reduced to ten percent or less the drive current through the LED load 20 under normal (non-dimmed) operating conditions. In other embodiments, the pre-selected amount of dimming may be selected to encompass dimming in which the drive current through the LED load 20 is reduced to five percent or less the drive current through the LED load 20 under normal operating conditions. In still other embodiments, the pre-selected amount of dimming may be selected to encompass dimming in which the drive current through the LED load 20 is reduced to one percent or less the drive current through the LED load 20 under normal operating conditions.

Figure 6:
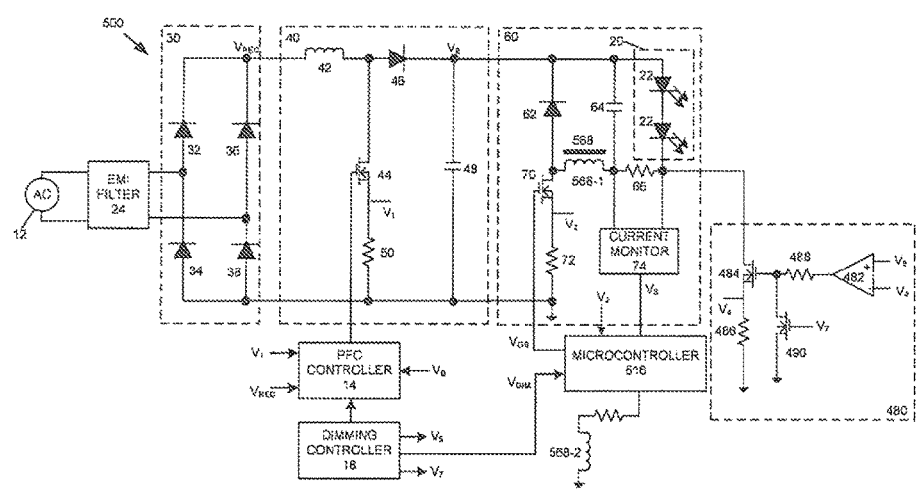
FIG. 6 is a circuit diagram of a driver circuit according to further embodiments of the present invention.

FIG. 6 is a circuit diagram of a driver circuit 500 according to further embodiments of the present invention. The driver circuit 500 is similar to the driver circuit 400 that is discussed above with reference to FIG. 5, except that in the driver circuit 500 a micro-controller based control circuit 516 is used to replace the analog buck controller 16 that is included in the driver circuit 400. In the driver circuit 500, the inductor 68 of driver circuit 400 is replaced with a first side 568-1 of a winding 568. The micro-controller based control circuit 516 may detect when the current through the winding 568 falls to zero by sampling the voltage across the second side 568-2 of the winding 568. When the voltage across the second winding 568-2 drops to a level close to zero from a high level after the switch 70 is turned off, the switch 70 is then turned back on again. The micro-controller based control circuit 516 may control the switch 70 based on the signals V2, V3 and VDIM. While not shown in FIG. 5, a second winding on inductor 68 may be used to sample the voltage across the inductor 68 in the driver circuit 400 of FIG. 5. When the voltage across this second winding drops to a level close to zero from a high level as the switch 70 is turned off, the switch 70 is turned back on again.

It will be appreciated by those skilled in the art that the front end of the buck converter 60 that is included in the current driver circuits 400, 500 of FIGS. 5 and 6 can have any appropriate topology including, for example, a flyback, a buck-boost or a buck topology. Likewise, the switching current regulation circuitry that is used to regulate the drive current to the LED load 20 during normal operating conditions and moderate levels of dimming can be any appropriate type of switching current regulation circuit. The present invention may improve on conventional driver circuits by providing a second current regulation circuit that is configured to provide high performance during ultra-low dimming operation. This second current regulation circuit may comprise a linear current regulator that can stably maintain a low drive current through an LED load. The driver circuits according to embodiments of the present invention may switch from a power efficient switching current regulation mode to a less efficient, but more stable, linear current regulation mode to achieve stable LED current and smooth dimming without flickering or shimmering when ultra-low dimming is required.

Figure 7A:
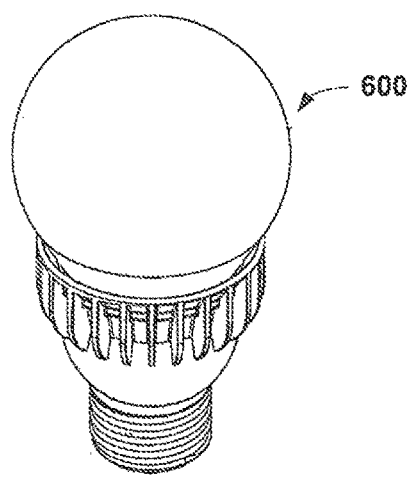
FIGS. 7A-7D are schematic perspective diagrams illustrating example solid state light fixtures according to embodiments of the present invention.
Figure 7B:
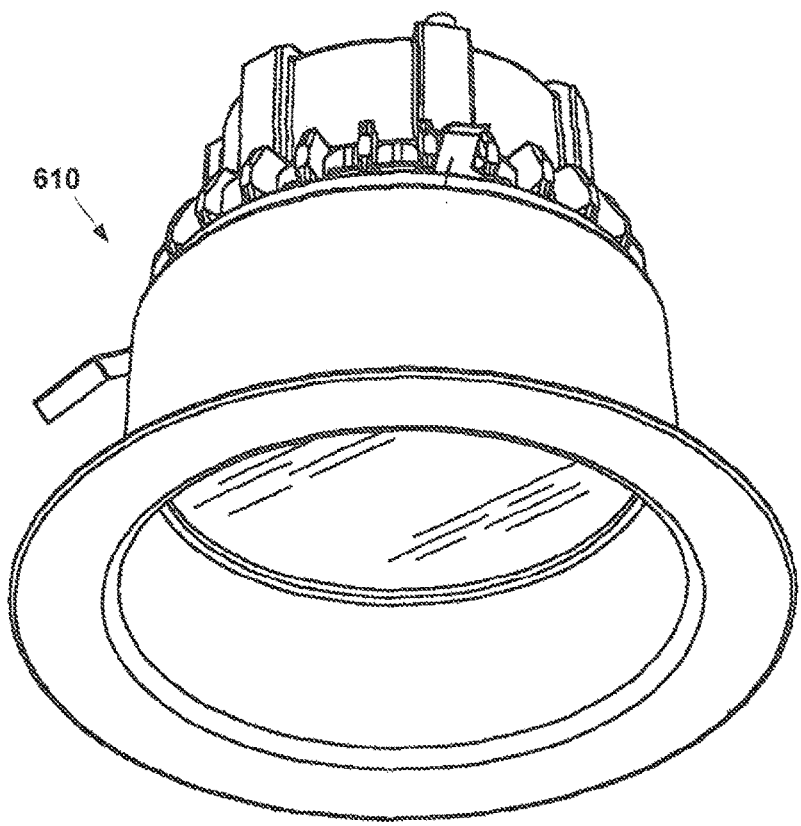
Figure 7C:
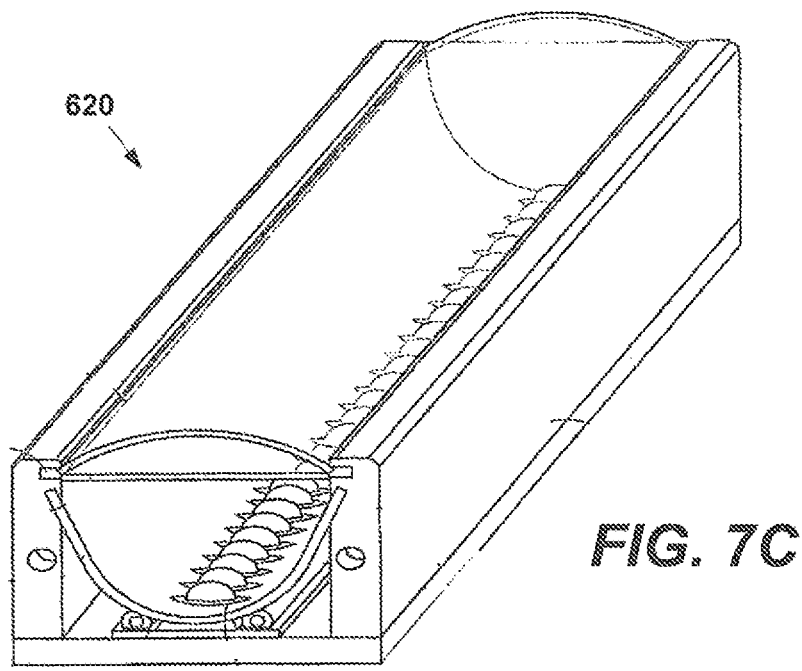
Figure 7D:
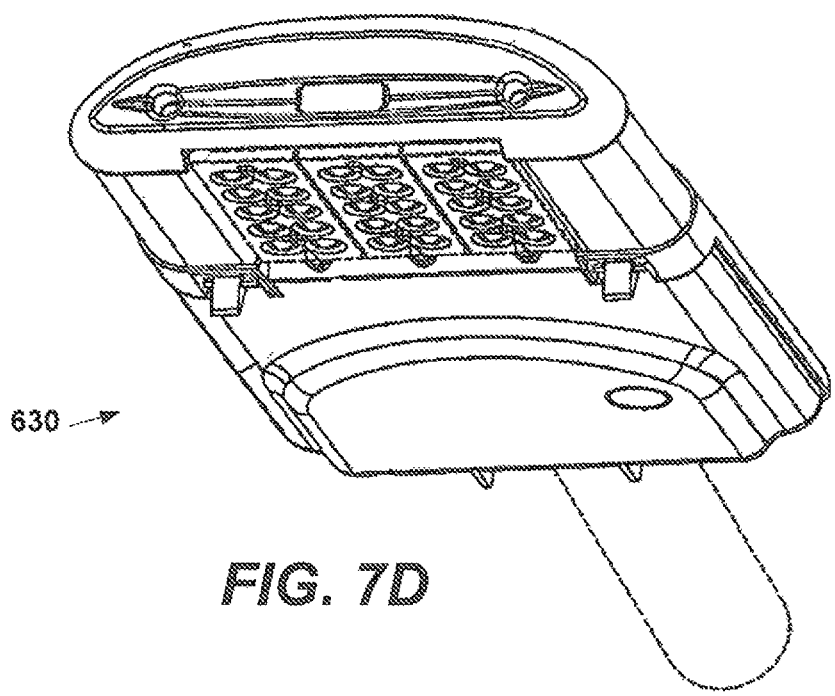

The driver circuits according to embodiments of the present invention may be incorporated into a solid state light fixture to provide an energy efficient fixture that may stably dim to ultra-low levels. These driver circuits may be incorporated into a wide variety of different types of solid state light fixtures. For example, FIG. 7A schematically illustrates a light bulb 600 that may include a driver circuit according to embodiments of the present invention. FIG. 7B schematically illustrates a downlight 610 that likewise may include one of the driver circuits according to embodiments of the present invention. FIG. 7C illustrates a "troffer" style solid state ceiling based light fixture 620 that may include one of the driver circuits according to embodiments of the present invention. FIG. 7D schematically illustrates a streetlight 630 that likewise may include one of the driver circuits according to embodiments of the present invention. It will be appreciated that the driver circuits according to embodiments of the present invention may be incorporated into any appropriate solid state light fixture.

As noted above, the solid state light fixtures according to embodiments of the present invention may be used in conjunction with sensors such as, for example, image sensors. The driver circuits disclosed herein may provide ultra low light levels utilizing very low amounts of energy while still providing enough light be utilized by sensor circuitry, such as image sensors or cameras, to improve sensor functionality and/or to enable sensor applications. The sensor may be internal to the solid state light fixture, and thus it will be appreciated that any of the solid state light fixtures 600, 610, 620, 630 illustrated in FIGS. 7A-7D may include an image sensor or a camera, and the solid state light fixture may be operated at ultra-low dimming levels (e.g., 1% or less of the light output during normal, non-dimmed operation) to maintain or improve sensor functionality. The driver circuits disclosed herein may also be included in, for example, any of the solid state light fixtures disclosed in U.S. patent application Ser. No. 15/018,806, entitled "LED LUMINAIRE HAVING ENHANCED THERMAL MANAGEMENT" and filed concurrently herewith on Feb. 8, 2016 and assigned to the same Assignee as the present application and/or U.S. Provisional Patent Application Ser. No. 62/292,528, entitled "DISTRIBUTED LIGHTING NETWORK" and filed concurrently herewith on Feb. 8, 2016 and assigned to the same Assignee as the present application, the entire contents of both of which are incorporated herein by reference.

Figure 8:
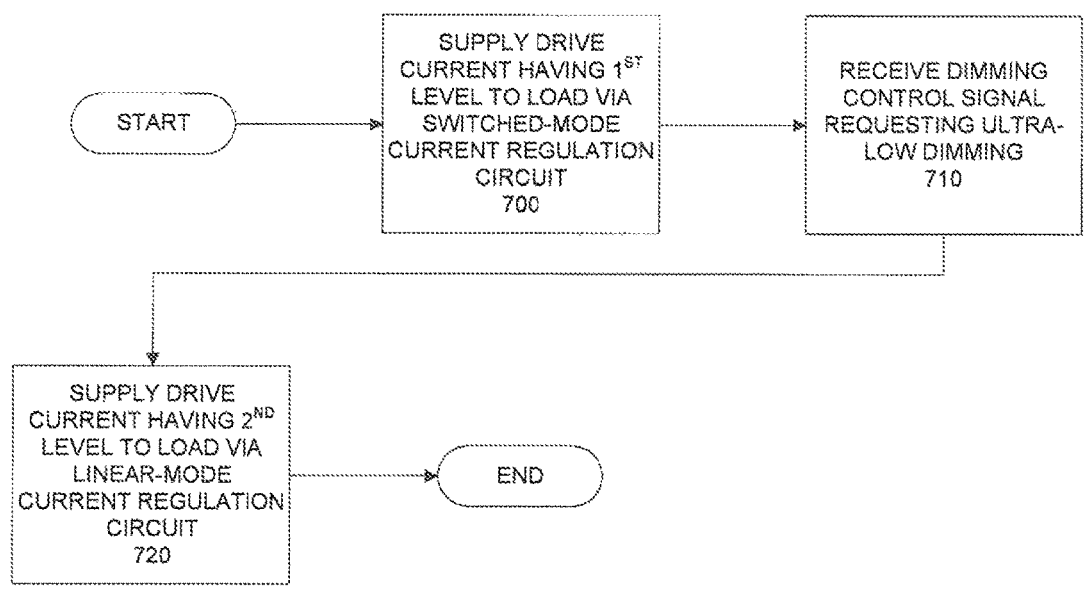
FIG. 8 is a flow chart illustrating a method of dimming a solid state light fixture according to embodiments of the present invention.

FIG. 8 is a flow chart illustrating a method of dimming a solid state light fixture according to embodiments of the present invention. As shown in FIG. 8, operations may begin with a drive current having a first average current level being supplied to an LED load via a first switched-mode current regulation circuit (Block 700). A dimming control signal may be received that request ultra-low dimming (Block 710). In response to the dimming control signal, a drive current having a second average current level that is less than the first average current level may be supplied to the LED load using a linear current regulator (Block 720).

It will be appreciated that a wide variety of changes may be made to the example embodiments described above without departing from the scope of the present invention. For example, in the embodiments of the present invention shown in the circuit diagrams of FIGS. 5 and 6, MOSFETs are used to implement various switches in the PFC boost converter 40, the buck converter 60 and the linear current regulator circuit 480. It will be appreciated that a wide variety of different elements may be used to implement these switches such as, for example, bipolar junction transistors, thyristors, insulated gate bipolar junction transistors and the like. As another example, while the driver circuits shown in the examples herein have an AC voltage source, it will be appreciated that a DC voltage source (e.g., a battery) may be used in other embodiments. In such embodiments, the rectifier may be omitted.

Figure 9:
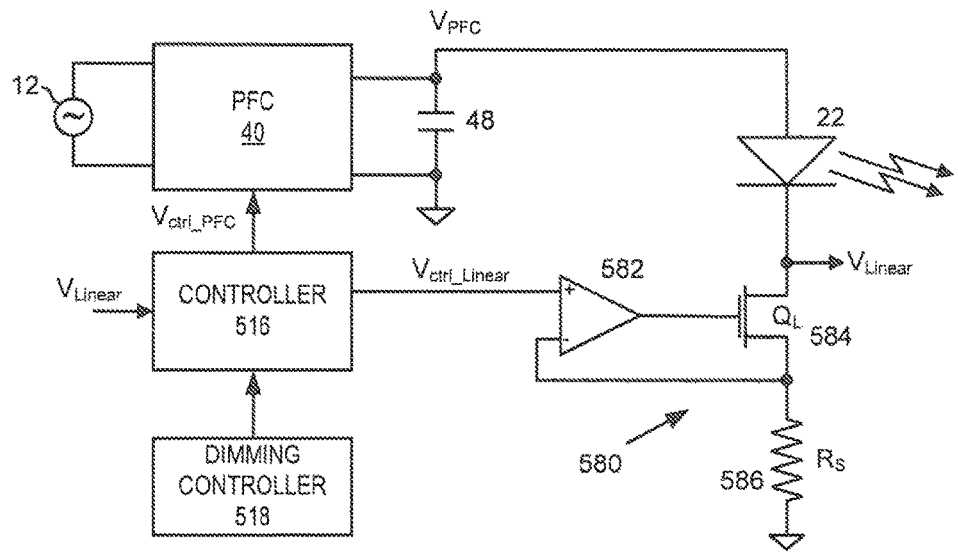
FIG. 9 is a schematic block diagram of a solid state light fixture according to further embodiments of the present invention.
Figure 10:
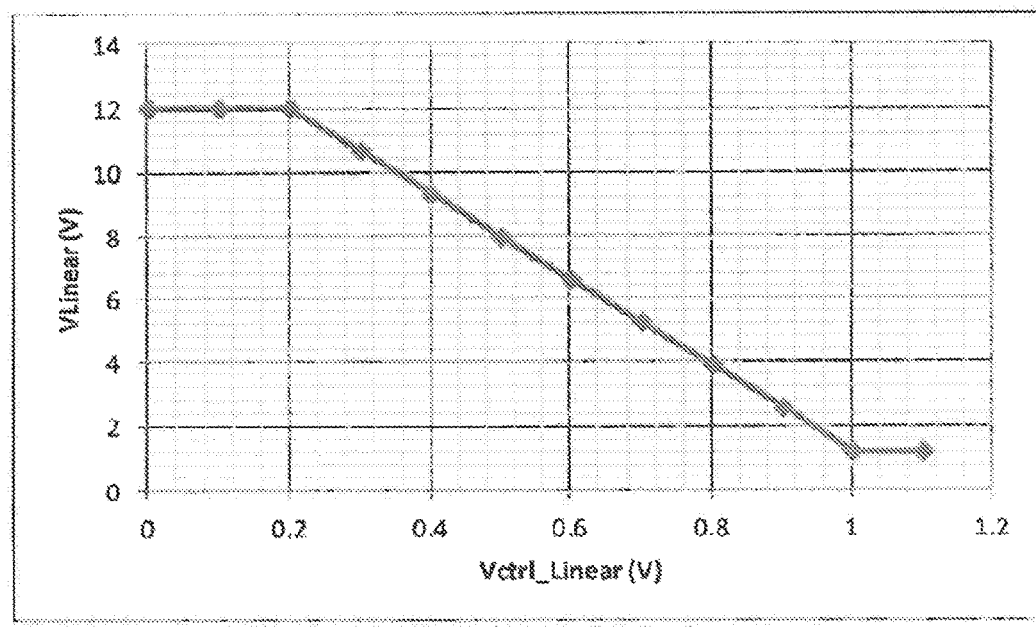
FIG. 10 is a graph illustrating the effect of a control voltage on the operation of the solid state light fixture of FIG. 9.

FIG. 9 is a schematic block diagram of a solid state light fixture according to further embodiments of the present invention, and FIG. 10 is a graph illustrating the effect of a control voltage on the operation of the solid state light fixture of FIG. 9.

In particular, some embodiments may omit the buck converter, while retaining the use of a linear current regulator for low level dimming. For example, a PFC circuit may supply a voltage to an LED load, while a linear voltage regulator is provided for low-level dimming.

Referring to FIG. 9, a boost PFC converter 40, which is a switch-mode voltage converter, may receive an AC voltage from a source 12 and supply a boost voltage $V_{PFC}$ across a capacitor 48, which provides an adjustable output voltage that drives the LED load 22. A linear regulator circuit 580 includes an error amplifier 582, a switch 584, and a current sensing resistor 586 having a resistance Rs. The switch 584 may be implemented, for example as MOSFET transistor switch, although other types of switches can be used.

A controller 516 senses a voltage $V_{Linear}$ at an output of the load 22 and generates a control signal $V_{ctrl\_linear}$ in response to the sensed voltage $V_{Linear}$ and a dimming control signal output by a dimming controller 518. The control signal $V_{ctrl\_linear}$ is supplied to the non-inverting input of the error amplifier 582, while a voltage across the current sensing resistor 586 (which is proportional to the current flowing through the load 22) is supplied to the inverting input of the error amplifier 518. The value of the control signal $V_{ctrl\_linear}$ may be selected to cause a predetermined level of current to flow through the load during low dimming conditions. During high dimming conditions, the value of the control signal $V_{ctrl\_linear}$ may be set high, turning the switch 584 on and reducing the power dissipated in the switch 584.

That is, under high power conditions, the voltage drop on the linear regulator should be kept low to reduce power loss. Under low dimming conditions, the voltage drop across the switch 584 increases to enable the linear regulator 580 to regulate current through the load even in the presence of ripple in the voltage provided by the PFC boost converter.

In the embodiments of FIG. 9, a first stage boost PFC converter 40 provides an output voltage $V_{PFC}$ with a high power factor to the load 22. A second stage linear current regulator 580 regulates the voltage that is dropped across the switch 584 based on a current sense signal output by the current sense resistor 586 and the control signal $V_{ctrl\_linear}$. The linear current regulator 580 controls the LED current to be:

$$I_{LED} = V_{ctrl\_linear}/Rs \quad [1]$$

The control target for the PFC stage 40 is the voltage on the linear regulator $V_{Linear}$. $V_{Linear}$ should be high enough under dimming condition so that the linear regulator can effectively control the LED current. The minimum value for $V_{Linear}$ can be estimated as:

$$V_{Linear\_min} = V_{ctrl\_linear} + V_{TH} \quad [2]$$

where $V_{TH}$ is the threshold voltage of the switch 584. With some headroom on $V_{Linear}$, the linear regulator can function properly even if there is some ripple on the output voltage $V_{PFC}$ of the PFC converter 40.

In order to achieve ultra-low dimming, the LED current should be regulated even if the PFC output voltage $V_{PFC}$ contains ripple. The voltage ripple may become large when a phase dimmer exists and the PFC controller enters burst mode operation at light load. Increasing the voltage $V_{Linear}$ can provide more headroom for the linear regulator 580 to handle ripple on the PFC output voltage and reduce/prevent flashing or flickering of the LEDs. Under high dimming conditions, a relatively high level of $V_{Linear}$ may be tolerated, as the small LED current would limit power loss. However, when the LED current is high, it is desirable for the voltage across the linear regulator 580 to be as small as possible to limit power loss and achieve good power efficiency for the overall circuit.

FIG. 10 illustrates a control strategy that may be employed in accordance with some embodiments. In particular, FIG. 10 is a graph of $V_{Linear}$ vs. $V_{ctrl\_linear}$. $V_{ctrl\_linear}$ ranges from 0V to 1.1V. Under dimming conditions, the linear regulator 580 regulates the current through the LED load 22 so that the current through the LED load 22 is proportional to $V_{ctrl\_linear}$. When the load current is large (i.e., when $V_{ctrl\_linear}$ is large), $V_{Linear}$ remains low, at about 1.2V. As the voltage drop on the transistor switch 584 is only 0.1V, power loss in the linear regulator 580 may remain acceptably low. As $V_{ctrl\_linear}$ near decreases, $V_{Linear}$ gradually increases. When $V_{ctrl\_linear}$ is below 0.2V, $V_{Linear}$ saturates at 12V, which should provide enough headroom for the linear regulator to provide a stable output current even in the presence of some ripple on the output voltage $V_{PFC}$ of the PFC regulator 40.

The control strategy can be adjusted according to the parameters of the particular circuit in which it is used. For example, the control strategy can be adjusted such that the switch 584 remains fully conductive until the dimming signal output by the dimming controller 518 passes a threshold level, with the linear regulator only regulating current during ultra-low dimming conditions and the PFC stage controlling LED current as the switch 584 is fully turned on under high power conditions.

Figure 11A:
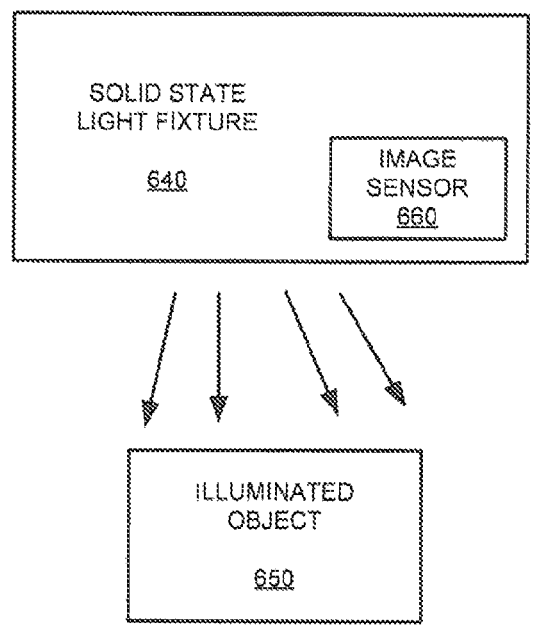
FIGS. 11A and 11B are schematic diagrams illustrating solid state light fixtures in accordance with some embodiments that include or that operate in conjunction with an image sensor.
Figure 11B:
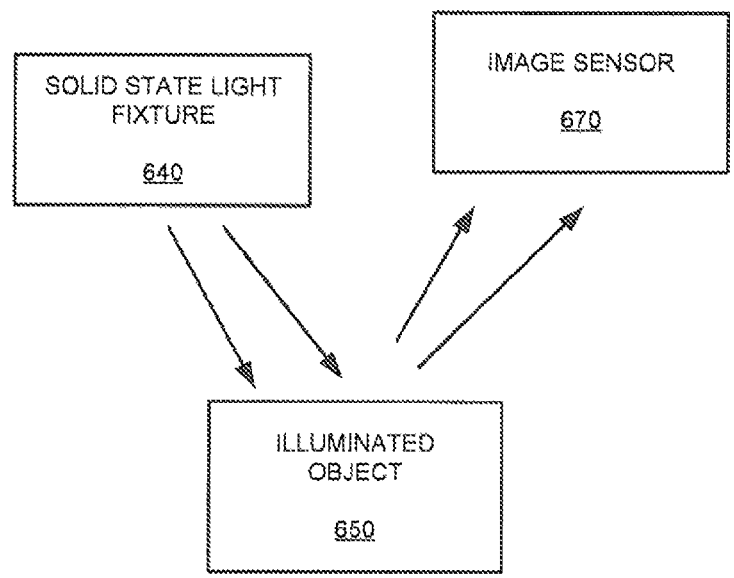

FIGS. 11A and 11B are schematic diagrams illustrating configurations of a solid state light fixture in accordance with some embodiments that include or that operate in conjunction with an image sensor. In particular, a solid state light fixture 640 in accordance with some embodiments may provide an ultra-low dimmable light source for illuminating an object 650. It will be appreciated that a solid state lighting fixture in accordance with some embodiments of the present invention need not include an image sensor, and that an image sensor need not be used in conjunction with a solid state lighting fixture in accordance with some embodiments. Rather, a solid state lighting fixture in accordance with embodiments of the invention may provide illumination with ultra-low dimming for other purposes.

An image of the object 650 that is illuminated at a low dimming level may be captured by an image sensor 660 (FIG. 11A) or 670 (FIG. 11B). In particular, the image sensor 660 shown in FIG. 11A is integral with the solid state lighting fixture 640, while the image sensor 670 shown in FIG. 11B is separate from the solid state lighting fixture 640. In either case, the image sensor 660, 670 may capture an image of the illuminated object 650 under ultra-low dimming conditions provided by the solid state lighting fixture 640.

The present invention is not limited to the illustrated embodiments discussed above; rather, these embodiments are intended to fully and completely disclose the invention to those skilled in this art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

All of the above-described embodiments may be combined in any way to provide a plurality of additional embodiments.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A solid state light fixture, comprising:
a light emitting diode (LED) load; and
a driver circuit that selectively provides one of a switched-mode drive current and a linear-mode drive current to the LED load in response to a dimming control signal.

2. The solid state light fixture of claim 1, wherein the driver circuit includes:
a first current regulation circuit that is configured to provide the switched-mode drive current to the LED load;
a second current regulation circuit that is configured to provide the linear-mode drive current to the LED load, wherein the second current regulation circuit includes a first switch that the linear-mode drive current continuously flows through when the second current regulation circuit is activated.

3. The solid state light fixture of claim 2, wherein a third switch that is included in the first current regulation circuit is configured to provide the switched mode drive current to the LED load when the first current regulation circuit is activated and to deactivate the first current regulation circuit when the second current regulation circuit is activated.

4. The solid state light fixture of claim 2, wherein the driver circuit includes a control circuit that is configured to disable the first current regulation circuit and enable the second current regulation circuit in response to the dimming control signal having a value specifying dimming the solid state light fixture below a preselected level.

5. The solid state light fixture of claim 3, wherein the first current regulation circuit includes a first resistor that is coupled in series with the third switch and the second current regulation circuit includes a first switch and a second resistor that are coupled in series to the LED load.

6. The solid state light fixture of claim 2, wherein the driver circuit further includes:
a rectifier circuit that is configured to rectify an input alternating current voltage;
a boost power factor correction converter that is coupled to an output of the rectifier; and
a buck converter that is coupled to an output of the boost power factor correction converter,
wherein the first current regulation circuit is part of the buck converter.

7. The solid state light fixture of claim 2, wherein the second current regulation circuit is coupled in series to the output of the LED load.

8. The solid state light fixture of claim 1, wherein the first switch is coupled in series between the LED load and a current sensing resistor.

9. The solid state light fixture of claim 8, wherein the second current regulation circuit includes an amplifier having an output that controls an amount of current flowing through the first switch to regulate the current flowing through the LED load.

10. The solid state light fixture of claim 9, wherein the second current regulation circuit further includes a second switch that is coupled in series between the output of the amplifier and ground.

11. The solid state light fixture of claim 9, wherein the amplifier has a first input that receives a signal that is proportional to a current flowing through the LED load and a second signal that is proportional to a reference current level for the LED load.

12. The solid state light fixture of claim 1, further comprising an image sensor configured to detect an image of an object illuminated by the LED load.

13. A solid state light fixture, comprising:
a light emitting diode (LED) load that includes a first LED;
a boost power factor correction converter that includes a first switch;
a driver circuit that supplies a drive current to the first LED, the driver circuit including a first current regulation circuit that includes a second switch and a second current regulation circuit that includes a third switch; and
a control circuit that is configured to set the second and third switches to selectively enable one of the first and second current regulation circuits to regulate the drive current.

14. The solid state light fixture of claim 13, wherein the control circuit is configured to selectively enable the second current regulation circuit and disable the first current regulation circuit in response to the dimming control signal having a value specifying dimming the solid state light fixture below a preselected level.

15. The solid state light fixture of claim 13, wherein the second current regulation circuit comprises a linear current regulator.

16. The solid state light fixture of claim 15, wherein the linear current regulator includes a fourth switch that is coupled in series between the LED load and a reference voltage.

17. The solid state light fixture of claim 16, wherein the linear current regulator includes an amplifier having an output that controls an amount of current flowing through the fourth switch to regulate the current flowing through the LED load.

18. The solid state light fixture of claim 13, wherein the first current regulation circuit comprises a switched-mode current regulation circuit.

19. The solid state light fixture of claim 18, wherein the second switch included in the first current regulation circuit is configured to provide a switched-mode drive current to the LED load when the first current regulation circuit is activated and to deactivate the first current regulation circuit when the second current regulation circuit is activated.

20. A solid state light fixture, comprising:
a light emitting diode (LED) load;
a boost power factor correction converter that includes a first switch and that supplies a drive current to the LED load;
a linear regulator that regulates a level of the drive current; and
a control circuit that is configured to cause the linear regulator to regulate the drive current in response to a dimming control signal.

* * * * *